US006246194B1

(12) United States Patent
Davies et al.

(10) Patent No.: US 6,246,194 B1
(45) Date of Patent: Jun. 12, 2001

(54) METHOD AND SYSTEM FOR DETECTING AN OBJECT IN AN AUTOMOTIVE WINDOW

(75) Inventors: Timothy Davies, Hermitage; Charles Hopson, Lebanon, both of TN (US); Christos Kyrtsos, Southfield; Joseph Tyckowski, Clawson, both of MI (US); Francois Breynaert, Caen (FR); Pascal Bonduel, Bouzy la Foret (FR)

(73) Assignee: Meritor Light Vehicle Systems, Inc., Troy, MI (US)

( * ) Notice: Subject to any disclaimer, the term of this patent is extended or adjusted under 35 U.S.C. 154(b) by 0 days.

(21) Appl. No.: 09/391,255

(22) Filed: Sep. 7, 1999

(Under 37 CFR 1.47)

(51) Int. Cl.[7] .......... H02P 3/00

(52) U.S. Cl. .......... 318/266; 318/264; 318/265; 318/267; 318/268; 318/283; 318/284; 318/286; 318/466; 49/27

(58) Field of Search .......... 318/264–267, 318/283–286, 466–469, 445; 49/27, 26, 28, 30, 33, 55; 200/61.43

(56) References Cited

U.S. PATENT DOCUMENTS

| | | | | |
|---|---|---|---|---|
| 5,038,087 | * | 8/1991 | Archer et al. | 318/469 |
| 5,315,220 | * | 5/1994 | Takimoto et al. | 318/282 |
| 5,436,539 | * | 7/1995 | Wrenbeck et al. | 318/265 |
| 5,461,294 | * | 10/1995 | Kitazawa | 318/685 |
| 5,483,132 | * | 1/1996 | Arata et al. | 318/282 |
| 5,661,385 | * | 8/1997 | McEwan | 318/478 |
| 5,701,063 | * | 12/1997 | Cook et al. | 318/469 |
| 5,850,131 | * | 12/1998 | Wolfer et al. | 318/466 |
| 5,898,288 | * | 4/1999 | Rice et al. | 318/685 |
| 5,942,966 | * | 8/1999 | Haake et al. | 337/4 |
| 5,952,801 | * | 9/1999 | Boivert et al. | 318/468 |
| 5,966,071 | * | 10/1999 | Tsuge et al. | 340/438 |
| 6,051,945 | * | 4/2000 | Furukawa | 318/280 |

FOREIGN PATENT DOCUMENTS

| | | | | |
|---|---|---|---|---|
| 408240068 | * | 9/1996 | (JP) | E05F/15/10 |
| 410018713 | * | 1/1998 | (JP) | E05F/15/20 |
| 02000087647 | * | 3/2000 | (JP) | E05F/15/10 |

* cited by examiner

*Primary Examiner*—Robert E. Nappi
*Assistant Examiner*—Tyrone Smith
(74) *Attorney, Agent, or Firm*—Carlson, Gaskey & Olds

(57) ABSTRACT

A method and system for directly determining the presence of an object between a window and its respective frame during closing of the window is disclosed. A sensor is provided within the frame to determine a length of the frame being compressed when the window is closed against the frame. This length is compared to a predetermined value. If the compressed length is less than the predetermined value, an object is detected so that the window can be controlled to stop and change direction so as to release the object before injury or damage occurs.

10 Claims, 1 Drawing Sheet

METHOD AND SYSTEM FOR DETECTING AN OBJECT IN AN AUTOMOTIVE WINDOW

BACKGROUND OF THE INVENTION

The invention relates to a method and system for detecting an object in an automotive window.

Many of the automotive vehicles today have electronically controlled windows and may even have electronically controlled sun/moon roofs. These systems provide the operator with ease in opening and closing the windows. However, if the operator is distracted while closing the window, it is possible for an object, such as an arm, hand or finger, to be caught between the window and the header, or frame, of the automotive window.

Techniques exist today to sense the presence of objects when the window is closed against its frame. These techniques indirectly detect an object by measuring such variables as current and voltage of the motor driving the closure of the window. As these variables decrease or increase compared to the normal operating variables, an object is assumed to be present. However, other circumstances may affect these variables, such as temperature and reliability of the motor.

Thus, there exists a need to directly sense the presence of objects caught between a window and its respective frame, which is not dependent on other circumstances.

SUMMARY OF THE INVENTION

An object caught between a closing automotive window and its respective frame is directly detected by determining a length of the frame being compressed when closing the window. The compressed length of the frame is compared to a predetermined value. If the compressed length is less than the predetermined value, an object is detected and the window can be controlled to stop and change direction.

A sensor whose output varies as the length of the frame is compressed varies is utilized to determine the compressed length of the frame. This can be accomplished by counting a number of circuits completed by opposing electrical contacts contained in the frame when compressed together. The strength of a signal generated by the completed circuits could alternatively be sensed to determine the length of the frame being compressed. In another embodiment, a sensor strip could be utilized in which the voltage signal varies as the length of the strip being compressed varies. By measuring the output voltage or resistance signal, it can be determined if only a portion of the frame is being compressed as opposed to the entire length of the frame.

These and other features of the present invention can be understood from the following specification and drawings.

DETAILED DESCRIPTION OF A PREFERRED EMBODIMENT

Figure 1A:
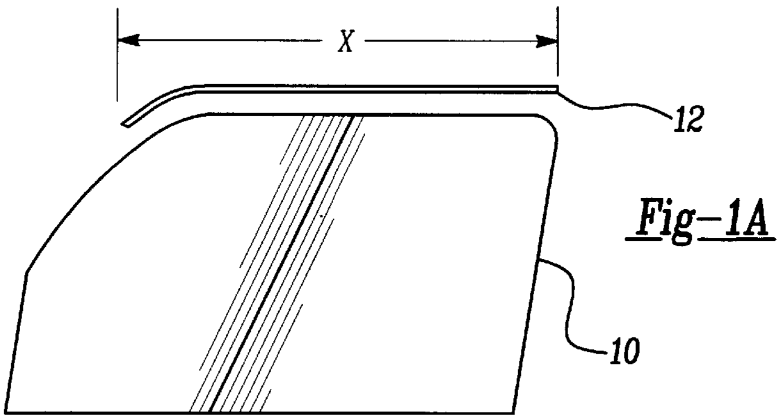
FIG. 1A is a schematic diagram of a window and its respective frame illustrating the absence of an object.
Figure 1B:
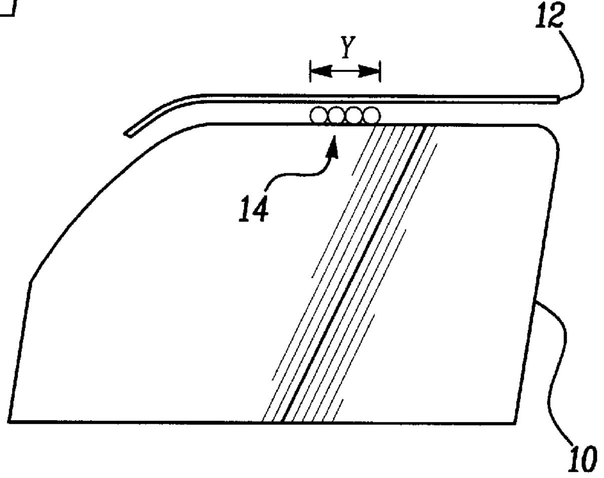
FIG. 1B is a schematic diagram of a window and its respective frame illustrating the presence of an object.

In FIG. 1A, an automotive side window 10 is shown with its respective frame 12. While a side window is shown, the term "window" as used in this application also extends to rear windows, moon roofs, sun roofs, or other vehicle closure components.

When an object is absent from the path of the window 10 as it closes against the frame 12, the entire length X of the frame 12 is compressed. However, when an object 14 is caught between the window 10 and the frame 12, only a portion Y of the length of frame 12 is compressed. Thus, by determining the length of the frame 12 being compressed when the window 10 is closed, the presence of an object 14 can be directly detected.

Figure 2:
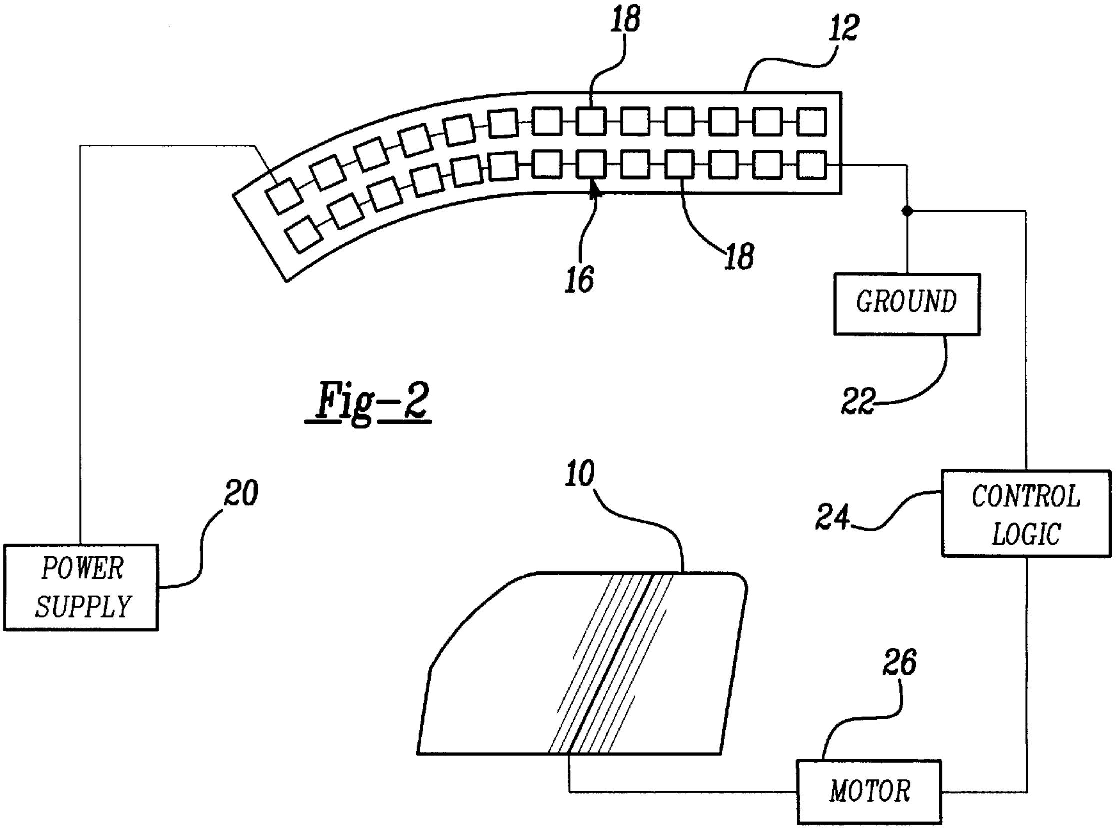
FIG. 2 is a schematic diagram of a preferred embodiment of the present invention.

The length of the frame 12 being compressed can be determined by incorporating a sensor in the frame 12 in which the output signal of the sensor changes depending on the length of the sensor being compressed. One such sensor is shown in FIG. 2, denoted generally by reference number 16. The sensor 16 includes a plurality of contacts 18 arranged in two parallel rows within the frame 12. The contacts 18 in one of the rows are coupled to a power supply 20 while the contacts 18 in the other one of the rows are coupled to ground 22. Therefore, when the contacts 18 contact each other a circuit is completed. The output signal of the sensor 16 is then sensed by control logic 24, which is coupled to a motor 26 that controls the opening and closing of the window 10.

In this embodiment, the length of the frame 12 being compressed can be determined in one of two ways. First, the contacts 18 may be arranged in a manner in which each of the completed circuit can be individually sensed. If only a portion of the possible circuits are completed, then an object can be assumed to be in the path of the closing window 10.

Alternatively, the contacts 18 may be arranged in a manner in which each of the completed circuits act together to vary the strength of the output signal depending on the number of contacts 18 compressed. If the strength of the output signal is less than a value expected when the entire frame 12 is compressed, then again an object can be assumed to be in the path of the closing window 10. The connections shown in FIG. 2 are schematic. It should be understood the connections could be in parallel.

The present invention is not limited to the sensor described above. Other types of sensors could be employed, such as a sensor strip whose voltage output varies as the length of the compression of the sensor varies. A worker in the relevant art could design such a strip.

Preferred embodiments have been disclosed. However, a worker in this art would recognize that modifications would come within the scope of this invention. Thus, the following claims should be studied to determine the scope and content of this invention.

What is claimed is:

1. A method for determining the presence of an object between a window and its respective frame during closing of the window, the method comprising:

determining a length of the frame being compressed when the window is closed against the frame;

comparing the length to a predetermined value; and sensing an object between the window and the frame if the length is less than the predetermined value.

2. The method as recited in claim 1 wherein a motor is connected to the window for opening and closing the window, and wherein the method further comprises controlling the motor in response to sensing the object.

3. The method as recited in claim 1 wherein the frame includes a sensor contained therein, the sensor generating an output signal dependent on the length of the sensor being compressed, and wherein determining the length comprises sensing the output signal of the sensor.

4. The method as recited in claim 3 wherein the output signal is a voltage signal and wherein sensing the output signal comprises sensing the voltage signal.

5. The method as recited in claim 3 wherein the sensor comprises a plurality of contacts arranged in one of a first and second row so that contacts in the first row complete a circuit with corresponding contacts in the second row when compressed together, and wherein sensing the output signal comprises sensing a number of completed circuits.

6. A system for determining the presence of an object between a window and its respective frame during closing of the window, the system comprising:

a sensor for sensing a length of the frame being compressed when the window is closed against the frame; and control logic operative to compare the length to a predetermined value and sense an object between the window and the frame if the length is less than the predetermined value.

7. The system as recited in claim 6 wherein a motor is connected to the control logic and the window for opening and closing the window, and wherein the control logic is further operative to control the motor in response to sensing the object.

8. The system as recited in claim 6 wherein the sensor comprises a plurality of contacts contained longitudinally in the frame, the plurality of contacts arranged in one of a first and second row so that contacts in the first row complete a circuit with corresponding contacts in the second row when compressed together, and wherein the length is determined by sensing a number of completed circuits.

9. The system as recited in claim 6 wherein the sensor comprises a sensor strip contained longitudinally in the frame that generates an output signal dependent on a length of the strip being compressed at a given time.

10. The system as recited in claim 9 wherein the output signal is a voltage signal.

* * * * *